United States Patent
Frangi et al.

(10) Patent No.: US 8,863,575 B2
(45) Date of Patent: Oct. 21, 2014

(54) MICROELECTROMECHANICAL THREE-AXIS CAPACITIVE ACCELEROMETER

(75) Inventors: Attilio Frangi, Milan (IT); Biagio De Masi, Corsano (IT); Barbara Simoni, Leghorn (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 235 days.

(21) Appl. No.: 13/161,345

(22) Filed: Jun. 15, 2011

(65) Prior Publication Data

US 2012/0000287 A1    Jan. 5, 2012

(30) Foreign Application Priority Data

Jun. 15, 2010    (IT) ................ TO2010A0511

(51) Int. Cl.
*G01P 15/125*    (2006.01)
*G01P 15/18*    (2013.01)

(52) U.S. Cl.
CPC ............ *G01P 15/125* (2013.01); *G01P 15/18* (2013.01)
USPC .................................. 73/514.32; 73/514.38

(58) Field of Classification Search
USPC ........ 73/514.32, 514.38, 514.18, 510, 514.24
See application file for complete search history.

(56) References Cited

U.S. PATENT DOCUMENTS

| 6,508,124 | B1 | 1/2003 | Zerbini et al. | |
| 6,752,017 | B2 | 6/2004 | Willig et al. | |
| 6,845,670 | B1* | 1/2005 | McNeil et al. | 73/514.32 |
| 6,935,175 | B2* | 8/2005 | Eskridge et al. | 73/514.32 |
| 7,258,012 | B2* | 8/2007 | Xie | 73/514.32 |
| 7,426,863 | B2* | 9/2008 | Kuisma | 73/514.32 |
| 7,487,661 | B2* | 2/2009 | Ueda et al. | 73/1.39 |
| 7,578,190 | B2* | 8/2009 | Lin et al. | 73/514.29 |
| 8,020,443 | B2* | 9/2011 | Lin et al. | 73/514.32 |
| 8,205,498 | B2* | 6/2012 | Hsu et al. | 73/514.32 |
| 8,272,268 | B2* | 9/2012 | Classen et al. | 73/514.32 |

(Continued)

FOREIGN PATENT DOCUMENTS

| DE | 102008001442 A1 | 11/2009 |
| DE | 102008041327 A1 | 2/2010 |

OTHER PUBLICATIONS

Galayko D. et al., "Clamped-Clamped Beam Micro-Mechanical Resonators in Thick-Film Epitaxial Polysilicon Technology," ESSDERC 2002, 32th European Solid-State Device Research Conference, Firenze, Italy, Sep. 24-26, 2002, pp. 447-450.

(Continued)

*Primary Examiner* — Helen Kwok
(74) *Attorney, Agent, or Firm* — Seed IP Law Group PLLC

(57) ABSTRACT

A micromechanical structure for a MEMS structure is provided with: a substrate; a single inertial mass having a main extension in a plane and arranged suspended above the substrate; and a frame element, elastically coupled to the inertial mass by coupling elastic elements and to anchorages, which are fixed with respect to the substrate by anchorage elastic elements. The coupling elastic elements and the anchorage elastic elements are configured so as to enable a first inertial movement of the inertial mass in response to a first external acceleration acting in a direction lying in the plane and also a second inertial movement of the inertial mass in response to a second external acceleration acting in a direction transverse to the plane.

24 Claims, 5 Drawing Sheets

(56) References Cited

U.S. PATENT DOCUMENTS

| | | | |
|---|---|---|---|
| 8,402,826 B2 * | 3/2013 | Classen et al. | 73/514.32 |
| 8,596,122 B2 * | 12/2013 | Classen et al. | 73/514.32 |
| 2006/0185433 A1 * | 8/2006 | Leonardson et al. | 73/514.32 |
| 2008/0011080 A1 * | 1/2008 | Merassi et al. | 73/510 |
| 2010/0122578 A1 * | 5/2010 | Classen | 73/514.32 |
| 2011/0154899 A1 * | 6/2011 | Classen et al. | 73/514.32 |

OTHER PUBLICATIONS

Lemkin, M., "A Three-Axis Micromachined Accelerometer with a CMOS Position-Sense Interface and Digital Offset-Trim Electronics," IEEE Journal of Solid-State Circuits 34(4):456-468, Apr. 1999.

* cited by examiner

MICROELECTROMECHANICAL THREE-AXIS CAPACITIVE ACCELEROMETER

BACKGROUND

1. Technical Field

The present disclosure relates to a MEMS (Micro-Electro-Mechanical System) three-axis capacitive accelerometer.

2. Description of the Related Art

As is known, surface-micromachining techniques enable creation of MEMS structures within layers of semiconductor material, which have been deposited (for example, a layer of polycrystalline silicon) or grown (for example, a layer of epitaxial silicon) on top of sacrificial layers, which are removed via chemical etching.

MEMS sensors made with the semiconductor technology are today used in a wide range of technological sectors, thanks to the small dimensions, versatility, and contained costs. In particular, accelerometer sensors are today widely used in the automotive field, for example in airbag systems, in stability-control systems (ESP®—Electronic Stability Program) and in brake-assist systems (ABS—Antilock Brake System), or in the field of consumer electronic devices, for example in cell phones, photographic or video cameras, videogames consoles, etc.

In particular, MEMS accelerometers made with micromachining techniques comprise mobile regions (usually referred to as "rotor regions", without this implying a movement thereof of a rotary type) suspended with respect to a substrate, and fixed regions (in general referred to as "stator regions"), fixed with respect to the same substrate and in particular to the accelerometer package. The mobile regions are connected to the substrate, directly or via interposition of appropriate coupling structures, by means of elastic biasing elements (referred to as "springs"), and are mobile as a result of the inertial effect with respect to the fixed regions along one or more axes, which constitute the axes of detection of the accelerometer, as a function of corresponding external accelerations.

Capacitive detection techniques are commonly used to determine the external acceleration acting on the sensor, as a function of the variation of capacitance defined by the capacitive coupling between the mobile regions and the fixed regions of the sensor, which form with one another capacitors with plane and parallel plates. In particular, the capacitive variation signal is processed with charge-integration techniques and amplified and filtered in a suitable manner to determine the value of the external acceleration.

In particular, three-axis accelerometer sensors have been proposed, which are able to detect components of linear acceleration acting along the three axes (x, y, and z) of a (Cartesian) system of three orthogonal axes fixed with respect to the corresponding package. These sensors comprise a micromechanical structure and moreover an appropriate electrical reading circuit, including hardware and/or software elements (for example, defined in the firmware of a processor).

Although advantageous owing to the integration in a single sensor (and in a single package) of the operations of detection along three mutually orthogonal detection axes, these sensors have in general rather large dimensions (with respect to MEMS devices, for example in the region of 1000 μm-1200 μm in the plane of horizontal extension). Even though numerous types of MEMS three-axes accelerometers, with a wide range of geometrical configurations of the corresponding micromechanical structure have in fact been proposed, none of these has proven optimized from the standpoint of their dimensions. In particular, generally these micromechanical structures require integration of an inertial mass for each detection axis (or, at most, of a first inertial mass for detecting accelerations acting in the plane of horizontal extension, and of a second inertial mass for detecting accelerations orthogonal to the same plane of horizontal extension), and moreover of the corresponding elements of elastic coupling with the substrate, which enable movement of the masses in the corresponding detection direction.

BRIEF SUMMARY

The present disclosure provides a MEMS accelerometer sensor that will have reduced dimensions and desired electrical characteristics.

According to one embodiment of the present disclosure, a micromechanical structure and a MEMS three-axis capacitive accelerometer are consequently provided. The micromechanical structure includes a substrate, a single inertial mass which has a main extension in a plane and is arranged suspended above said substrate, a frame element, elastically coupled to said inertial mass by coupling elastic elements, and coupled to anchorages, fixed with respect to said substrate, by anchorage elastic elements, wherein said coupling elastic elements and said anchorage elastic elements are configured so as to enable a first inertial movement of said inertial mass in response to a first external acceleration in a first direction lying in said plane, and to enable a second inertial movement of said inertial mass in response to a second external acceleration in a second direction transverse to said plane.

BRIEF DESCRIPTION OF THE SEVERAL VIEWS OF THE DRAWINGS

For a better understanding of the present disclosure, a preferred embodiment thereof is now described, purely by way of non-limiting example and with reference to the attached drawings, wherein.

DETAILED DESCRIPTION

As will be discussed in detail in what follows, one aspect of the present disclosure envisages providing a MEMS three-axis accelerometer, of a capacitive type, comprising a single inertial mass, designed to enable detection of three mutually orthogonal components of acceleration, each directed along a corresponding detection axis of a set of three orthogonal axes, fixed with respect to a substrate, or to a package, of the same MEMS three-axis accelerometer. The single inertial mass is appropriately suspended above the substrate so that it is able to perform movements of detection along the three detection axes of the set of three orthogonal axes.

Figure 1:
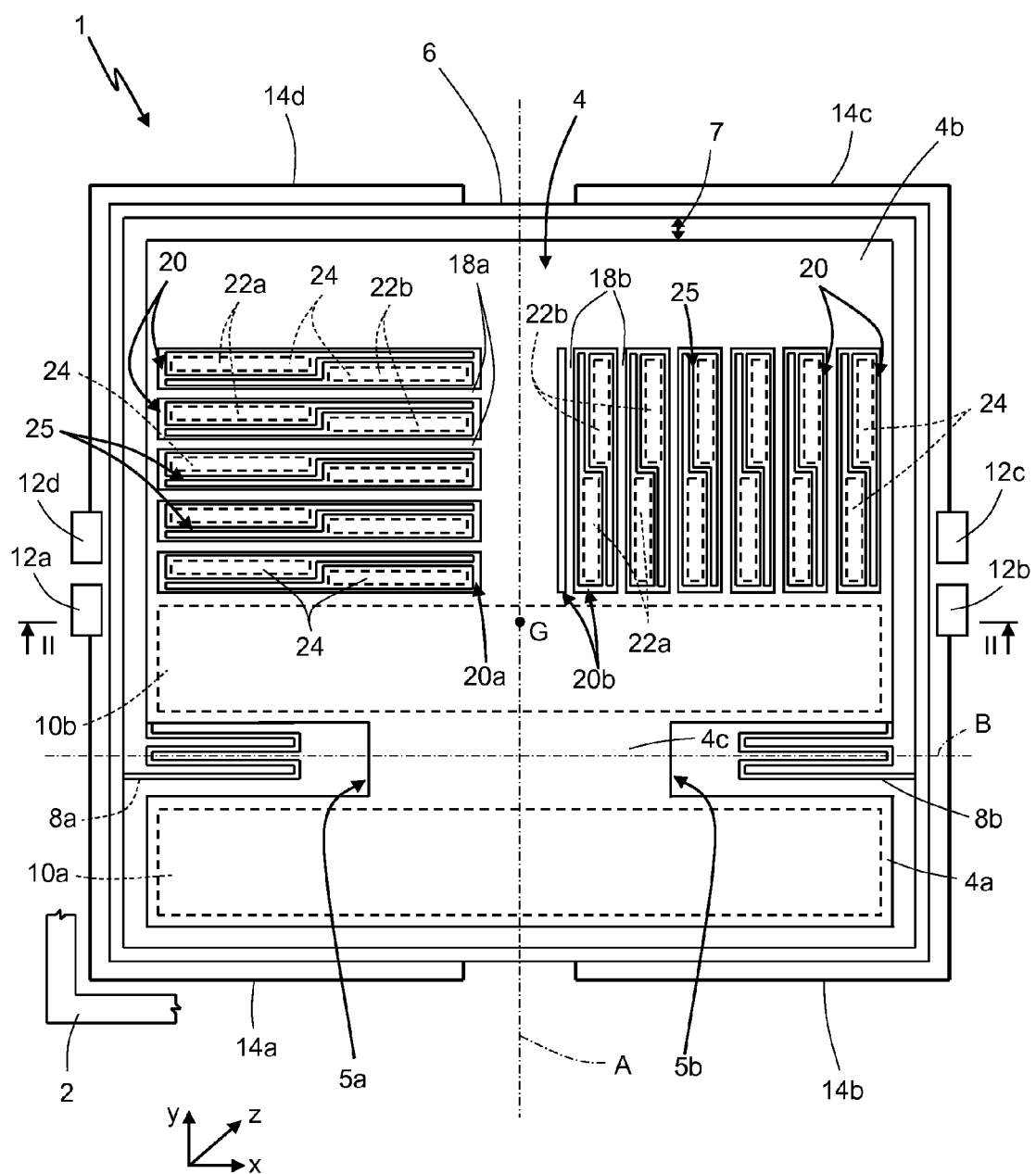
FIG. 1 is a schematic top plan view of a micromechanical structure of a MEMS three-axis capacitive accelerometer, according to one embodiment of the present disclosure.

FIG. 1 shows a micromechanical structure 1, which is integrated in a die 2 of semiconductor material and is made with surface-micromachining processes, such as, for example, the THELMA (Thick Epi-poly Layer for Microactuators and Accelerometers) process (see for example: D. Galayko, A. Kaiser, B. Legrand, L. Buchaillot, C. Combi, D. Collard "Clamped-Clamped Beam Micro-Mechanical Resonators in Thick-Film Epitaxial Polysilicon Technology", ESSDERC 2002, European Solid-State Circuits Conference, Firenze, pp. 447-450).

In a known manner, the THELMA process envisages formation of MEMS structures in thick layers of epitaxial polysilicon (for example, layers having a thickness of 15 μm), in general by means of the successive steps of: formation of electrodes and conductive paths, electrically insulated from one another by means of an underlying dielectric layer, on top of a silicon substrate; growth of a sacrificial layer (for example a silicon-oxide layer) on top of the substrate; chemical etching for definition of openings in the sacrificial oxide, in the areas in which elements for anchorage to the substrate are to be formed; growth of an epitaxial layer, once again a silicon layer; deep chemical etching of the silicon for definition of the mobile and fixed elements of the MEMS structure; and removal of the sacrificial layer by means of chemical etching through holes previously made through the epitaxial layer, for release of the mobile elements of the MEMS structure.

The micromechanical structure 1 provides, together with a corresponding electronic signal-conditioning circuitry (described hereinafter), a MEMS three-axis capacitive accelerometer, capable of detecting components of linear acceleration acting along the three detection axes of a set of three orthogonal axes fixed with respect to the die 2 and to the package, not illustrated herein, of the accelerometer. Horizontal detection axes x and y of the set of three axes define a horizontal plane xy of main extension of the micromechanical structure 1, whilst an orthogonal detection axis z defines a direction orthogonal to the aforesaid horizontal plane xy, along which the micromechanical structure 1 has an extension substantially negligible with respect to its main extension in the horizontal plane xy.

In detail, the micromechanical structure 1 comprises a single inertial mobile mass 4, used, as described hereinafter, for inertial detection of horizontal external acceleration components $a_x$, $a_y$, acting in the horizontal plane xy along the horizontal detection axes x, y, and of an orthogonal external acceleration component $a_z$, acting along the orthogonal detection axis z. For example, the inertial mass 4 has a substantially rectangular conformation in the horizontal plane xy, and an axis of symmetry A, parallel to the horizontal detection axis y. The inertial mass 4 is made, for example, of conductive semiconductor material, such as epitaxially grown polycrystalline silicon.

In greater detail, the inertial mass 4 has a first portion 4a and a second portion 4b, wider than the same first portion 4a along the horizontal detection axis y, which are connected by a connecting portion 4c, less wide, in a direction parallel to the horizontal detection axis x, as compared to the first and second portions 4a, 4b (which, instead, have the same extension along the same horizontal detection axis x). The inertial mass 4 thus has a pair of recesses 5a, 5b, laterally with respect to the connecting portion 4c and symmetrical with respect to the axis of symmetry A. Consequently, the inertial mass 4 has an asymmetrical distribution of mass along the horizontal detection axis y, and a center of gravity G of its own located within the second portion 4b, on the axis of symmetry A.

The micromechanical structure 1 further comprises a rigid frame element 6, which surrounds the inertial mass 4 entirely in the horizontal plane xy, at a given distance from the same inertial mass 4 so as to form a gap 7. For example, the frame element 6 has a substantially rectangular profile in the horizontal plane xy, with sides parallel, in pairs, to the horizontal detection axes x, y and to corresponding sides of the inertial mass 4. The frame element 6 is thin, has a main extension in the longitudinal direction, along the horizontal detection axis x or y, and an extension in a direction orthogonal to the same longitudinal direction that is much shorter (for example, even by two orders of magnitude) than the direction of main extension (and than a corresponding extension of the inertial mass 4). In particular, the frame element 6 is arranged, and configured, in such a way as to undergo, as a result of the inertial effect, accelerations in the horizontal plane xy and in such a way as to not be subject to accelerations along the orthogonal detection axis z.

The inertial mass 4 is mechanically coupled in an elastic way to the frame element 6, via a first coupling elastic element 8a and a second coupling elastic element 8b, which are arranged in respective recesses 5a, 5b, laterally with respect to the connecting portion 4c, on opposite sides with respect to the axis of symmetry A and symmetrically thereto. The coupling elastic elements 8a, 8b, obtained, in a known way, via micromachining of the same layer of semiconductor material as the one starting from which the inertial mass 4 is defined, are, for example, of the folded (or coiled) type, and are each made up of a first plurality of arms parallel to one another and to the horizontal detection axis x and are connected by a second plurality of arms, which are also parallel to one another and to the horizontal detection axis y. For example, each coupling elastic element 8a, 8b has a first horizontal arm parallel to the horizontal detection axis x, having an end portion connected and joined to the frame element 6, and a second horizontal arm, parallel to the horizontal detection axis y, having a respective end portion connected and joined to the inertial mass 4, and in particular to the second portion 4b of the same inertial mass 4. The coupling elastic elements 8a, 8b are arranged substantially as a prolongation of one another along the horizontal detection axis x.

In particular, the coupling elastic elements 8a, 8b are configured so as to support the inertial mass 4 in a way suspended above a substrate (here not illustrated) of the die 2. Underneath the inertial mass 4, a first vertical-detection electrode 10a and a second vertical-detection electrode 10b are arranged on the substrate, from which they are separated by an insulating layer (as described more fully hereinafter). The first vertical-detection electrode 10a is set underneath, and facing, the first portion 4a of the inertial mass 4, whilst the second vertical detection electrode 10b is set underneath, and facing, the second portion 4b of the inertial mass 4 so as to form a first vertical-detection capacitor and a second vertical detection capacitor.

The coupling elastic elements 8a, 8b, of a torsional type, are configured for uncoupling, in at least one given operating condition, the inertial mass 4 from the frame element 6. In particular, the coupling elastic elements 8a, 8b are configured so as to enable, as the sole relative movement between the inertial mass 4 and the frame element 6, a movement of rotation of the same inertial mass 4 out of the horizontal plane xy (as a result of the inertial effect, in the presence of an acceleration transverse to the horizontal plane xy), about an axis of rotation B extending parallel to the horizontal detection axis x, in the direction of extension of the coupling elastic elements 8a, 8b. The coupling elastic elements 8a, 8b are, instead, stiff in regard to translations of the inertial mass 4 in the horizontal plane xy (as a result of the inertial effect in the presence of an acceleration acting in the horizontal plane xy), rigidly constraining the inertial mass 4 to the same frame element 6 during these movements of translation. In other words, the coupling elastic elements 8a, 8b have ideally infinite stiffness in bending and are compliant to torsion.

Since the center of gravity G of the inertial mass 4 does not lie on the axis of rotation B (referred to the relative rotation between the inertial mass 4 and the frame element 6), an external acceleration with direction transverse to the horizontal plane xy (and in particular the corresponding component of acceleration directed along the orthogonal detection axis z) induces a rotation of the inertial mass 4 out of the horizontal plane xy (or, equivalently, its inclination about the axis of rotation B), and hence an approach thereof to a first one of the vertical-detection electrodes 10a, 10b and a corresponding moving away from the other of the same vertical-detection electrodes 10a, 10b. Consequently, a capacitance differential variation occurs in the vertical-detection capacitors, which can be readily detected by an appropriate processing electronics (as described more fully hereinafter). It should be noted that the differential nature of the variation of the two vertical-detection capacitors (which undergo opposite variations) advantageously enables filtering of possible thermal effects, which could cause a common-mode approach of the inertial mass 4 with respect to the underlying vertical-detection electrodes 10a, 10b.

The frame element 6 is elastically coupled to the substrate of the micromechanical structure 1 via respective anchorage elastic elements, which are configured so as to constrain the movement thereof with respect to the substrate to translations in the horizontal plane xy, in particular to translations along the horizontal detection axes x and y.

In the example illustrated in FIG. 1, the frame element 6 is mechanically connected to four anchorages 12a-12d (which are, in turn, rigidly connected to the substrate, and are constituted, for example, by column, or pillar, elements, extending vertically between the substrate and the horizontal plane xy), via four respective anchorage elastic elements 14a-14d (shown schematically in FIG. 1). In particular, the anchorages 12a-12d are arranged in pairs on opposite sides and symmetrically with respect to the axis of symmetry A, laterally outside the frame element 6 (and consequently outside the inertial mass 4), in a central position with respect to the same inertial mass 4. Each anchorage elastic element 14a-14d has a first portion extending along the horizontal detection axis y and mechanically connected to a respective anchorage 12a-12d, and a second portion extending along the horizontal detection axis x (substantially at right angles with respect to the respective first portion) and mechanically connected to the frame element 6. The anchorage elastic elements 14a-14d are, for example, of the folded type, thus having (in a way not illustrated in FIG. 1) a respective first and second plurality of arms, parallel to one another along the horizontal detection axis x or y, one end of which being connected to the frame element 6 or to the respective anchorage 12a-12d. In particular, the anchorage elastic elements 14a-14d are configured so as to constrain the movement of the frame element 6 with respect to the substrate to a translation in any direction in the horizontal plane xy, following upon the inertial displacement of the inertial mass 4 as a function of external accelerations acting in the same horizontal plane xy, and in particular of corresponding acceleration components along the horizontal detection axes x, y.

A plurality of first mobile electrodes 18a are defined in the second portion 4b of the inertial mass 4; the first mobile electrodes 18a are arranged parallel to the horizontal detection axis x and are designed to implement detection of the horizontal external acceleration $a_y$ acting along the horizontal detection axis y; on the opposite side with respect to the axis of symmetry A, a plurality of second mobile electrodes 18b, also defined in the second portion 4b of the inertial mass 4, are arranged parallel to the horizontal detection axis y and designed to enable detection of a horizontal external acceleration $a_x$ acting along the horizontal detection axis x. In particular, the mobile electrodes 18a, 18b are constituted by thin longitudinal strips obtained by chemical etching of the second portion 4b of the inertial mass 4, connected at their ends to the same inertial mass 4 and fixed with respect thereto.

Mobile electrodes 18a, 18b arranged parallel and adjacent to one another define, between them, respective windows 20, which traverse the inertial mass 4 throughout its entire thickness. Within each window 20, a first fixed electrode 22a and a second fixed electrode 22b are arranged, which are rigidly constrained to the substrate of the micromechanical structure 1 through respective anchorages 24 (represented with a dashed line in FIG. 1), and are electrically insulated from one another. In particular, all the first fixed electrodes 22a and all the second fixed electrodes 22b, referred to one and the same horizontal detection axis x or y, are electrically connected to one another via respective electrical-biasing paths (as will be described more fully hereinafter).

In greater detail, each of the fixed electrodes 22a, 22b is arranged so as to present: a first external face (orthogonal to the horizontal plane xy and parallel to the orthogonal detection axis z) parallel to and facing a corresponding external face of a respective mobile electrode 18a, 18b, with which it thus forms a horizontal detection capacitor, of the type with plane and parallel plates; and a second external face, opposite to the first external face, which faces the other fixed electrode 22b, 22a arranged in the same window 20, and having in top plan view a piecewise-linear profile.

In greater detail, as highlighted in FIG. 1, the first and second fixed electrodes 22a, 22b of one and the same pair are arranged in the respective window 20 so as to define as a whole an encumbrance having a rectangular extension in the horizontal plane xy, substantially corresponding to the extension of the same window 20. These fixed electrodes 22a, 22b are separated from one another by a gap 25, with respect to which they are mirrored. Each fixed electrode 22a, 22b thus has a main portion, substantially rectangular in the horizontal plane xy, and a thin portion of extension, set as prolongation of the main portion; advantageously, the respective anchorage 24 is set underneath the main portion.

It may be noted in any case that both the mobile electrodes 18a-18b and the fixed electrodes 22a-22d are contained within the encumbrance of the inertial mass 4, in particular being defined within two openings 20a, 20b (constituted by the joining of the various windows 20) that traverse the entire thickness of the inertial mass 4, and are arranged on opposite sides with respect to the axis of symmetry A. More particularly, a leftmost mobile electrode 18b is formed between two openings or windows 20b through the mass 4. In this embodiment, a leftmost window 20b is not positioned above any fixed electrodes, however, in other embodiments, the leftmost window 20b may be positioned above fixed electrodes.

Each mobile electrode of the first and second pluralities of mobile electrodes 18a, 18b is hence set facing two respective fixed electrodes 22a, 22b, each set in one of the two windows 20 that face the same mobile electrode, thus forming a first horizontal detection capacitor and a second horizontal detection capacitor, which undergo differential capacitive variations in the presence of a horizontal external acceleration (along the horizontal detection axis x or y, according to the arrangement of the mobile electrode with respect to the axis of symmetry A).

In particular, the mobile electrodes 18a, 18b move fixedly with respect to the inertial mass 4, in its linear movement along the horizontal detection axes x and/or y; this movement causes an approach of the mobile electrodes 18a, 18b with respect to a first of the fixed electrodes 22a, 22b facing them, and a corresponding moving away from the other of the same fixed electrodes 22b, 22a. It should again be noted that the differential nature of the variation of the two horizontal detection capacitors enables filtering of possible thermal effects, which could cause a common-mode approach of the inertial mass 4 with respect to the fixed electrodes 22a, 22b facing it.

Figure 2:
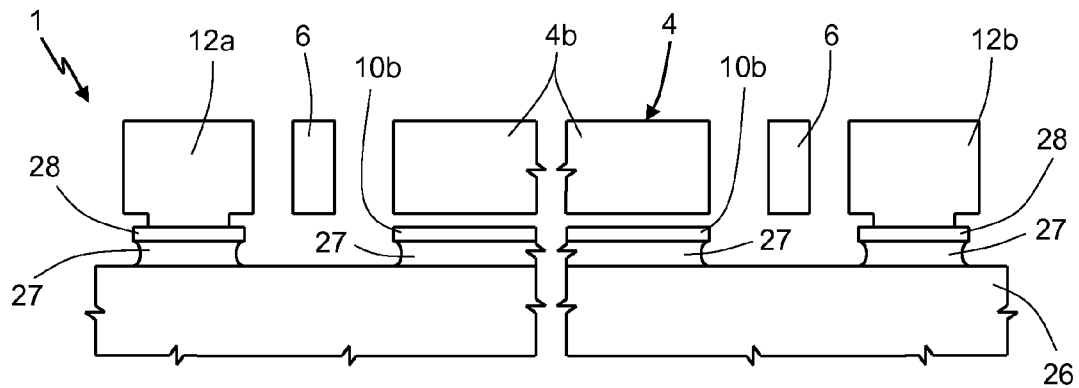
FIG. 2 is a cross-sectional view taken along the line 2-2 of FIG. 1.

The cross section of FIG. 2 shows the substrate, designated by 26, of the die 2 of the micromechanical structure 1, above which the suspended structures of the inertial mass 4 and of the frame element 6 are made. In particular, FIG. 2 shows the presence of an electrical insulating layer 27 (made, for example, of silicon oxide), laid on a top surface of the substrate 26 (substantially parallel to the horizontal plane xy), and designed to separate the substrate 26 from electrical biasing regions 28 and electrical connection paths.

For example, FIG. 2 shows a first electrical biasing region and a second electrical biasing region 28, set between the electrical insulating layer 27 and the respective anchorage 12a, 12b of the frame element 6. In a way not illustrated in FIG. 2, the electrical biasing regions 28 are moreover electrically connected to one another by an electrical connection path that reaches an external contact pad, for biasing of the inertial mass 4. FIG. 2 moreover shows the second vertical-detection electrode 10b, set underneath the second portion 4b of the inertial mass 4, which is also electrically insulated from the substrate 26 by the electrical insulating layer 27.

Figure 3:
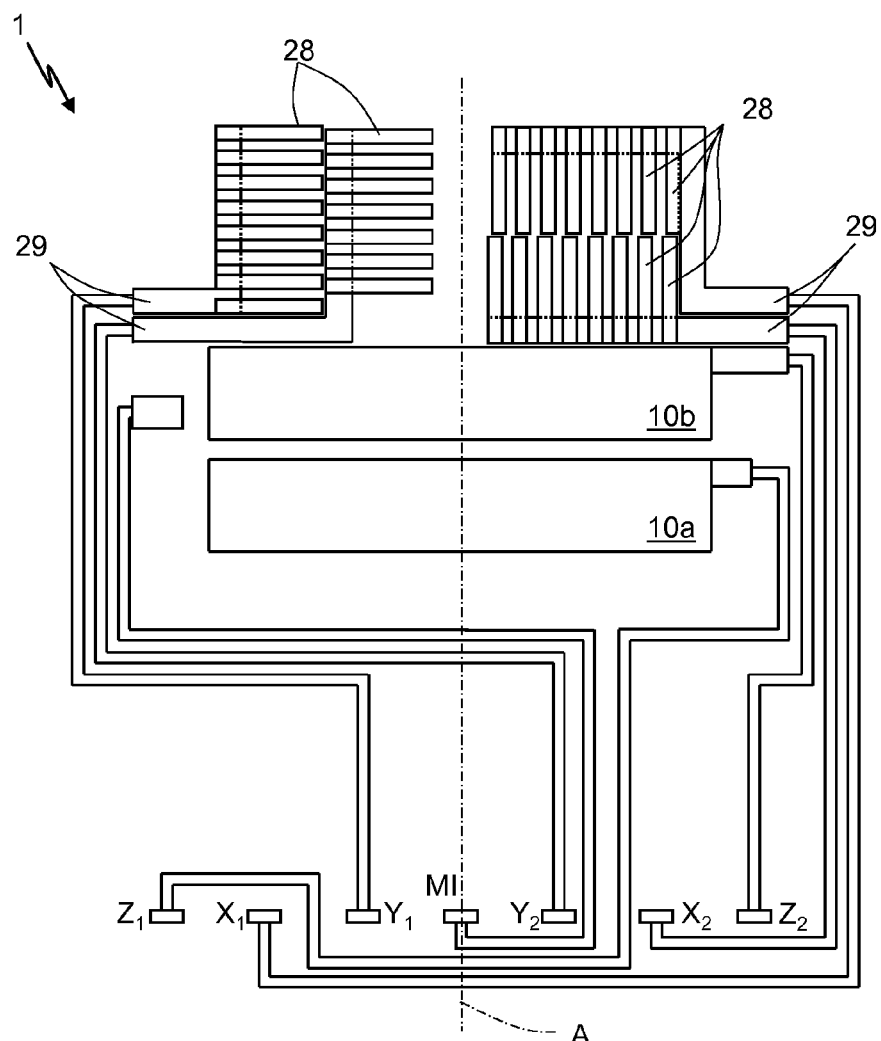
FIG. 3 shows a simplified diagram of electrical connections towards elements of the micromechanical structure of FIG. 1.

FIG. 3 is a schematic depiction of the electrical connection paths towards the micromechanical structure 1, which enable implementation of the aforesaid scheme of differential detection along the horizontal detection axes x and y, and along the orthogonal detection axis z (it should be noted that only the electrical biasing regions and the electrodes of the micromechanical structure 1, provided on top of the substrate 26, are represented in FIG. 3, for greater clarity).

In particular, a pair of electrical-connection pads is present for each one of the detection axes x, y, z (designated respectively by $X_1$-$X_2$, $Y_1$-$Y_2$ and $Z_1$-$Z_2$), and an electrical-connection pad is moreover present for connection of the inertial mass 4 (designated by MI); the electrical-connection pads of each pair are arranged symmetrically with respect to the axis of symmetry A.

The first fixed electrodes 22a, as likewise the second fixed electrodes 22b referred to the same direction of detection are electrically connected to one another, on account of the presence of electrical connection paths 29 that connect to one another the electrical biasing regions, designated once again by 28, of the respective anchorages 24. The inertial mass 4 is biased through the anchorages 12a-12d and the corresponding electrical biasing regions 28 (electrically connected to one another by further electrical connection paths 29), the anchorage elastic elements 14a-14d and the anchorages 12a-12d being made of electrically conductive material.

Figure 4:
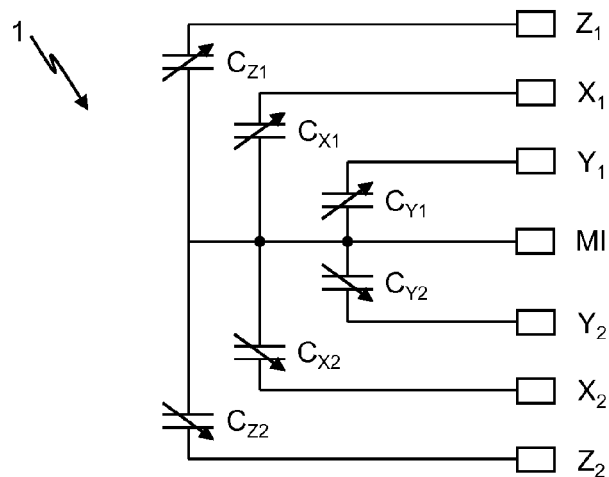
FIG. 4 shows an equivalent electrical circuit of the micromechanical structure of FIG. 1.

As shown in FIG. 4, an equivalent electrical circuit of the micromechanical structure 1 comprises the horizontal detection capacitors (designated by $C_{x1}$-$C_{x2}$ and $C_{y1}$-$C_{y2}$) and the vertical-detection capacitors (designated by $C_{z1}$-$C_{z2}$), which undergo capacitive variations of opposite sign, such as to enable implementation of a differential-reading scheme. Each of the detection capacitors has a first plate connected to the electrical-connection pad MI of the inertial mass 4, and a second plate connected to a corresponding electrical-connection pad $X_1$, $X_2$, $Y_1$, $Y_2$, $Z_1$ or $Z_2$.

Figure 5:
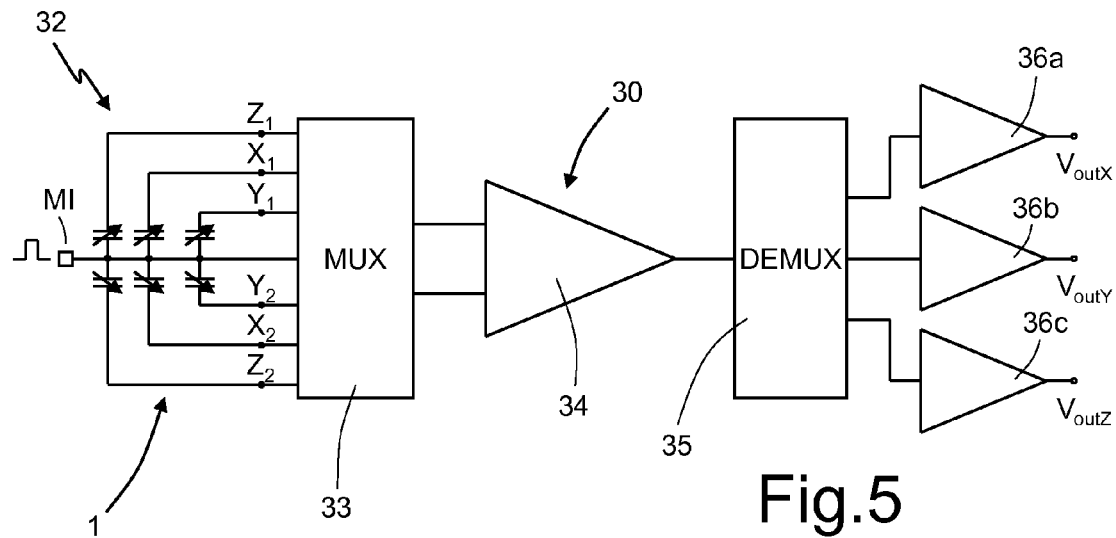
FIG. 5 shows a block diagram of a MEMS three-axis capacitive accelerometer comprising the micromechanical structure of FIG. 1 and a corresponding electronic reading circuit.

FIG. 5 shows a block diagram of a possible electronic detection circuit, designated as a whole by 30, coupled to the micromechanical structure 1, for detecting the electrical quantities (capacitive variations) generated by the same micromechanical structure 1, and reading of the values of external acceleration; the micromechanical structure 1 and the electronic detection circuit 30 form together a three-axis accelerometer 32.

The electrical-connection pads $X_1$-$X_2$, $Y_1$-$Y_2$ and $Z_1$-$Z_2$ are connected to the inputs of a multiplexer stage 33, which selects alternatively for processing, according to the detection direction of interest, a pair between the horizontal detection capacitors $C_{x1}$-$C_{x2}$ or $C_{y1}$-$C_{y2}$ and the vertical-detection capacitors $C_{z1}$-$C_{z2}$. A processing stage 34, cascaded to the multiplexer stage 33, and comprising a charge-integrator amplifier, amplifies the differential capacitive variation received at input, and supplies at output an electrical signal, in particular a voltage signal, which is a function of the value of the acceleration acting in the selected detection direction. A demultiplexer stage 35, cascaded to the processing stage 34 supplies the electrical output signal to a first output stage 36a, a second output stage 36b, or a third output stage 36c, corresponding, respectively, to the horizontal detection axis x or y, or to the orthogonal detection axis z. The output stages 36a-36c carry out possible further operations of amplification and filtering on the signal received at input, and supply at output respective electrical output signals $V_{outx}$, $V_{outy}$, $V_{outz}$, which are indicative of the values of external acceleration detected along the respective detection axes x, y, z. For the detection operations, a reading signal (for example, of the square-wave type) is supplied to the electrical-connection pad MI of the inertial mass 4.

The advantages of the microelectromechanical three-axis capacitive accelerometer made according to the present disclosure emerge clearly from the foregoing description.

In particular, the presence of a single inertial mass 4, for detecting the external accelerations acting along the three detection axes x, y and z of the set of three orthogonal axes, enables a considerable reduction of the dimensions of the micromechanical structure and of the corresponding sensor; by way of example, one embodiment of the micromechanical structure 1 has a maximum encumbrance in the horizontal plane xy of 500-600 μm, along the horizontal detection axes x and y, in the case where a sensitivity of 5 fF/g is achieved.

The reduced dimensions that it is possible to obtain moreover enable improvement of the performance of the accelerometer in regard to the deformations of the corresponding package induced by the variation in external temperature. In fact, by reducing the dimensions of the device also the distances between the anchorage points of the mobile parts, which are subject, in a known way, to variations due to temperature, decrease.

The use of a differential-detection scheme for the three detection axes x, y, z moreover allows an excellent linearity in the response to the external accelerations to be achieved, and moreover a reduction of the thermal drifts.

Figure 6:
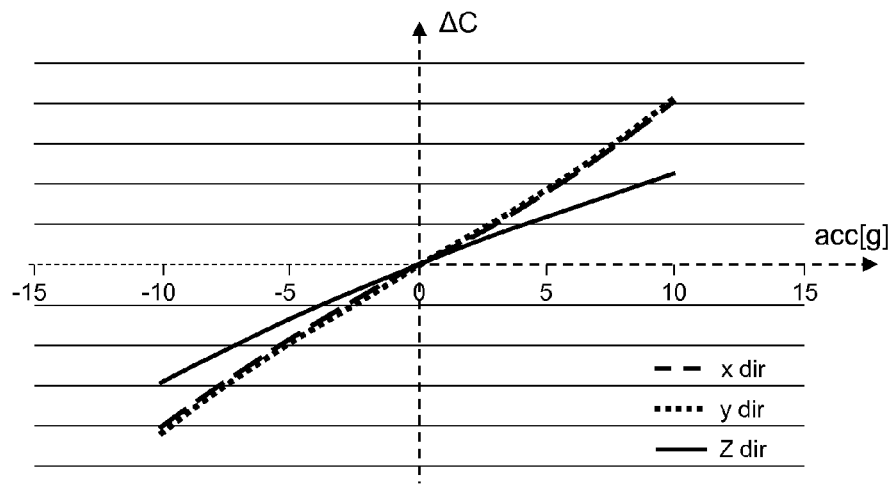
FIG. 6 shows exemplary plots of electrical quantities generated in the MEMS three-axis capacitive accelerometer of FIG. 5.

In this regard, FIG. 6 shows a plot of an exemplary capacitive variation ΔC (expressed in fF) along the detection axes x, y and z, as a function of an input acceleration (expressed in g) acting on the micromechanical structure 1 along the respective detection axis x, y, z; this plot highlights the linearity of the operation of detection, in a wide range of input values of acceleration (+/−10 g).

In addition, via an adequate calibration of the coupling elastic elements 8a, 8b and of the anchorage elastic elements 14a-14d, it is possible to obtain a high uncoupling between the various detection axes x, y, z, and in particular extremely reduced values of cross-sensitivity (in other words, an input acceleration along a given detection axis causes output signals of a negligible value referred to the other detection axes). In particular, the orthogonal detection axis z is perfectly uncoupled from the horizontal detection axes x, y (with substantially zero cross-sensitivity values). Advantageously, in other words, the coupling elastic elements 8a, 8b, designed to enable detection of the accelerations along the orthogonal detection axis z, are substantially uncoupled from the anchorage elastic elements 14a-14d, which are designed to enable detection of the accelerations along the horizontal detection axes x and y.

In addition, advantageously, the sensor can have substantially the same values of sensitivity in the detection of the components of acceleration directed along the horizontal detection axes x and y and along the orthogonal detection axis z.

Figure 7:
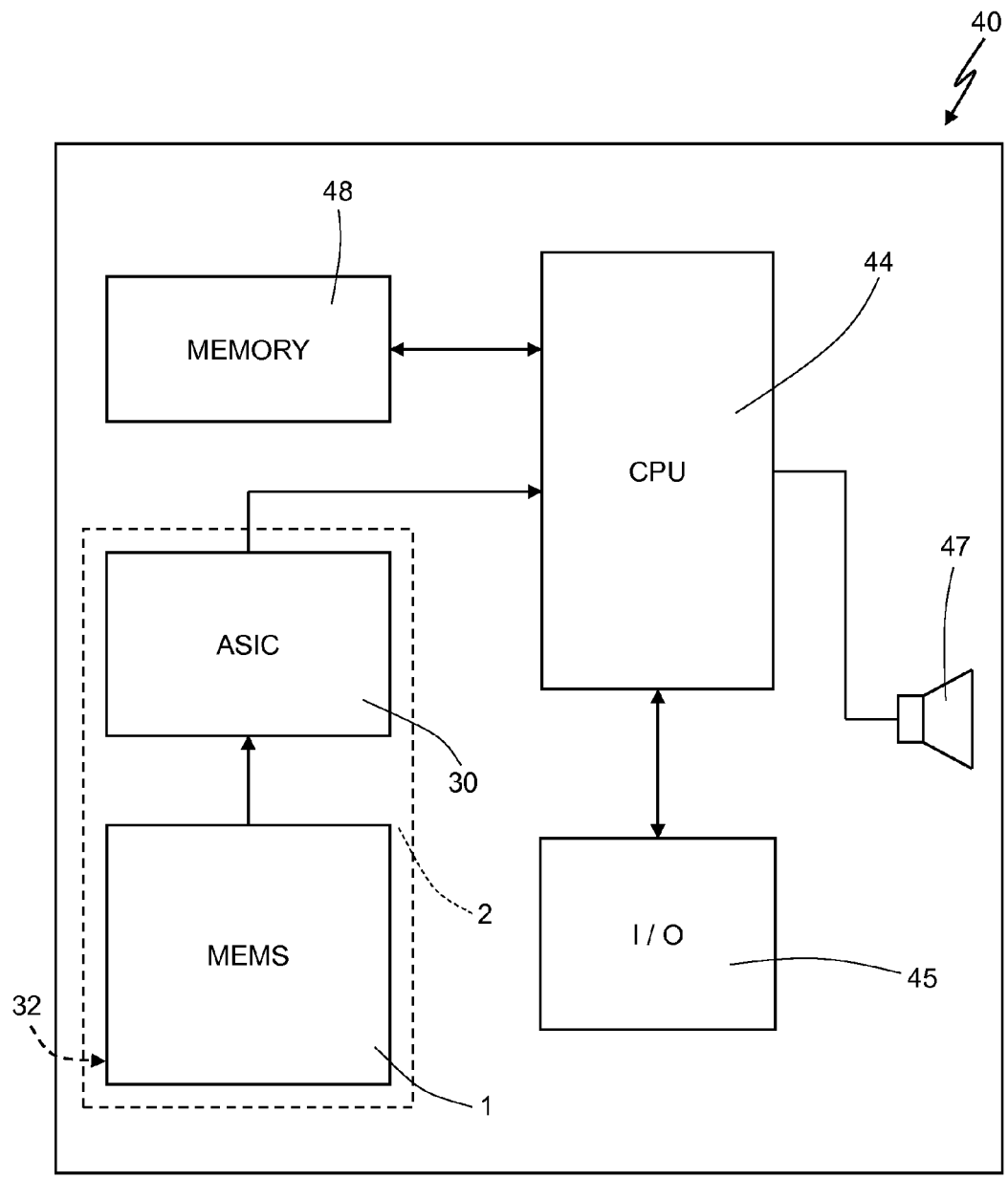
FIG. 7 is a block diagram of an electronic device incorporating the MEMS three-axis capacitive accelerometer of FIG. 5.

The characteristics previously described hence render the use of the micromechanical structure 1 and of the corresponding three-axis accelerometer 32 particularly advantageous in an electronic device 40, as the one illustrated schematically in FIG. 7. In particular, the electronic detection circuit 30 can be made as an ASIC (Application-Specific Integrated Circuit), integrated in the same die 2 in which the micromechanical structure 1 is provided (or, alternatively, in a respective die housed in the same package of the die 2 of the micromechanical structure 1).

The electronic device 40 is, for example, a mobile portable communication device, such as a cell phone, a PDA (personal digital assistant), a portable computer, or a digital audio player with voice-recording capacity, a photographic or video-camera, a controller for videogames, etc.; the electronic device 40 is generally able to process, store and/or transmit and receive signals and information.

The electronic device 40 comprises a microprocessor (CPU) 44, which receives the acceleration signals detected by the three-axis accelerometer 32, and an input/output interface 45, provided for example with a keyboard and a display, connected to the microprocessor 44. In addition, the electronic device 40 may comprise a loudspeaker 47, for generating sounds on an audio output (not illustrated), and an internal memory 48.

Finally, it is clear that modifications and variations may be made to what has been described and illustrated herein, without thereby departing from the scope of the present disclosure.

For example, the dimensions and the geometrical shape of the elements that constitute the micromechanical structure 1 may vary with respect to what is illustrated in FIG. 1. The inertial mass 4 can have a different shape, for example a square shape, in the horizontal plane xy; the fixed electrodes 22a, 22b can have a rectangular shape in the horizontal plane xy and be set alongside and parallel to one another; the connecting portion 4c of the inertial mass 4 can have a different extension along the horizontal detection axis x. In addition, the openings containing the electrodes may be different as regards size, shape, and configuration.

Figure 8:
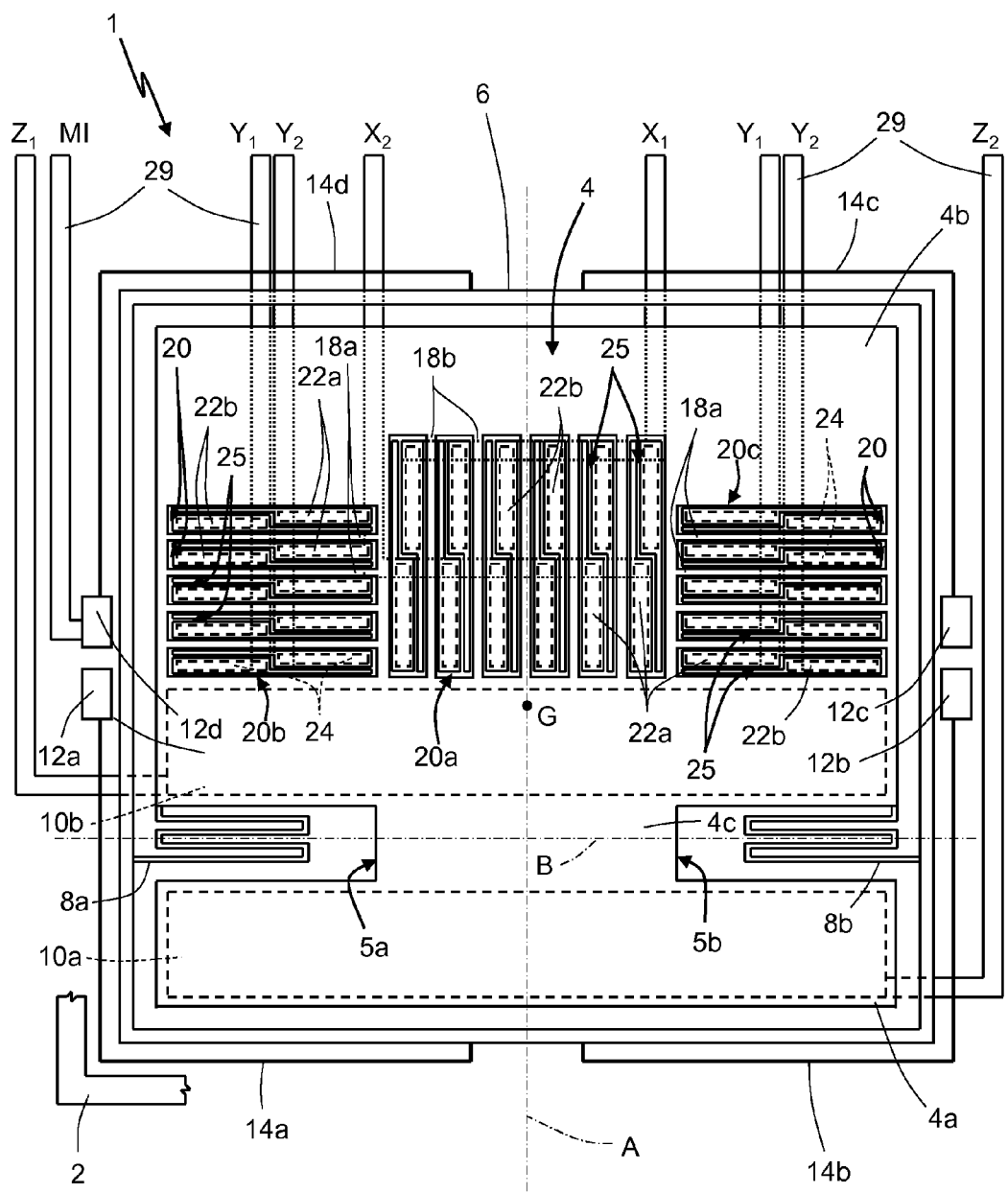
FIG. 8 is a schematic top plan view of a micromechanical structure of a MEMS three-axis capacitive accelerometer, according to a different embodiment of the present disclosure.

For example, as illustrated in FIG. 8, the micromechanical structure 1 can envisage a first opening, designated by 20a, containing fixed electrodes 22a, 22b for detecting accelerations along the horizontal detection axis x (since they are parallel to the horizontal detection axis y), set in a central position, along the axis of symmetry A, between two further windows, designated by 20b and 20c, which contain fixed electrodes 22a, 22b (electrically connected to one another) for detecting acceleration along the horizontal detection axis y (since they are parallel to the horizontal detection axis x). FIG. 8 moreover shows the electrical connection paths 29 towards the corresponding electrical-connection pads $X_1$, $X_2$, $Y_1$, $Y_2$, $Z_1$, $Z_2$ (for the mobile and fixed electrodes), and MI (for the inertial mass 4).

In addition, the configuration and type of the coupling elastic elements 8a-8b and of the anchorage elastic elements 14a-14d may be different, provided that they in any case allow a relative movement between the inertial mass 4 and the frame element 6. For example, the coupling elastic elements 8a-8b can be designed not only for enabling rotation, but also for enabling translation in a direction orthogonal to the plane xy of the inertial mass 4 with respect to the frame element 6 (or else, the coupling elastic elements 8a-8b can be such as to enable only the translation of the inertial mass 4 along the orthogonal detection axis z).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micromechanical structure, comprising:
   a substrate;
   a mass having a main extension in a plane suspended above said substrate, the plane having a first direction and a second direction, the mass having:
   a center line along the first direction;
   a plurality of first openings;
   a plurality of second openings separated from the plurality of first openings by the center line, a first one of the plurality of second openings being positioned adjacent to a second one of the plurality of second openings, the first one and the second one of the second openings having a same length in the first direction, a first width of the first one of the second openings being larger than a second width of the second one of the second openings, the first and second width both extending along the second direction, a first portion of the mass separating the first one of the second openings from the second one of the second openings and forming a first mobile electrode;
   a first pair of fixed electrodes formed on the substrate, the first pair of fixed electrodes configured to extend into the first one of the second openings to interact with the first mobile electrode;
   coupling elastic elements;
   anchorages attached to the substrate;
   elastic anchorage elements;
   a frame element, elastically coupled to said mass by the coupling elastic elements and coupled to the anchorages by the elastic anchorage elements, said coupling elastic elements and said anchorage elastic elements are configured to enable a first inertial movement of said mass in response to a first external acceleration in the first direction, and to enable a second inertial movement of said mass in response to a second external acceleration in a third direction transverse to said plane.

2. The micromechanical structure according to claim 1, wherein the first mobile electrode and the first pair of fixed electrodes are part of a plurality of first capacitive-coupling elements, coupled to said mass and configured to generate at least a first capacitive variation in response to said first inertial movement; and a second electrode formed on the substrate and capacitively coupled to the mass to form second capacitive-coupling elements configured to generate at least a second capacitive variation in response to said second inertial movement of said mass.

3. The micromechanical structure according to claim 1, wherein said frame element surrounds said mass in said plane; and wherein said coupling elastic elements are configured to rigidly couple the mass to said frame element in said first inertial movement and mechanically uncouple the mass from said frame element in said second inertial movement.

4. The micromechanical structure according to claim 1, wherein said first inertial movement is a movement of translation in the first direction in said plane; and wherein said coupling elastic elements are configured to rigidly couple said mass to said frame element in said movement of translation, and said anchorage elastic elements are configured to be compliant to said movement of translation, to enable a relative movement of said frame element with respect to said substrate.

5. The micromechanical structure according to claim 4, wherein said second inertial movement is a movement of rotation out of said plane about a rotation axis defined by said coupling elastic elements; and wherein said coupling elastic elements are configured to be compliant to said movement of rotation, to enable a relative movement of said mass with respect to said frame element.

6. The micromechanical structure according to claim 1, wherein said first external acceleration comprises a first horizontal acceleration component and a second horizontal acceleration component directed along a first horizontal detection axis and, respectively, a second horizontal detection axis, which are mutually transverse and lie in said plane; and wherein said second external acceleration comprises a vertical acceleration component directed along a vertical detection axis, transverse to said plane and to said first detection horizontal axis and said second detection horizontal axis.

7. The micromechanical structure according to claim 2, wherein said mass includes a third one of the second openings having the same length as the first one and the second one of the second openings and the same width as the first one of the second openings, a second portion of the mass separating the first one of the second openings from the third one of the second openings and forming a second mobile electrode, a second pair of fixed electrodes formed on the substrate, the second pair of fixed electrodes configured to extend into the third one of the second openings to interact with the second portion of the mass, first inertial movement is a movement of translation in said plane.

8. The micromechanical structure according to claim 7, wherein said first capacitive-coupling elements include the second mobile electrode and the second pair of fixed electrodes, the first and second mobile electrode being fixed with respect to said mass, the first mobile electrode facing and parallel to a first one of the fixed electrodes of the first pair of fixed electrodes, the second mobile electrode facing and parallel to a second one of the fixed electrodes of the first pair of fixed electrodes, and the second mobile electrode facing and parallel to one of the fixed electrodes from the second pair of fixed electrodes, the first and second mobile electrodes and the first and second pairs of fixed electrodes configured to form a horizontal detection capacitors and to undergo a differential capacitive variation in response to said movement of translation, a value of which is a function of the value of said first external acceleration; said first external acceleration comprises a first horizontal acceleration component and a second horizontal acceleration component directed along a first horizontal detection axis and, respectively, a second horizontal detection axis, which are mutually transverse and lie in said plane.

9. The micromechanical structure according to claim 2, wherein said second inertial movement is a movement of rotation out of said plane about a rotation axis defined by said coupling elastic elements; and wherein said second capacitive-coupling elements comprise the second electrode and a third electrode, which are fixed with respect to, and arranged on top of, said substrate underneath said mass, on opposite sides with respect to said rotation axis; said second electrode and said third electrode being capacitively coupled to said mass to form a pair of vertical-detection capacitors, configured to undergo a differential capacitive variation in response to said movement of rotation, a value of which is a function of the value of said second external acceleration.

10. The micromechanical structure according to claim 9, wherein said mass has an asymmetrical distribution of mass in a direction transverse to said rotation axis in such a way as to have a center of gravity offset with respect to said rotation axis.

11. The micromechanical structure according to claim 10, wherein said mass has, on said rotation axis, a first recess and a second recess, which are set on opposite sides with respect to an axis of symmetry of said mass, transverse to said rotation axis; and wherein said coupling elastic elements comprise a first elastic element and a second elastic element, each extending within a respective one between said first recess and said second recess, starting from said mass towards said frame element.

12. The micromechanical structure according to claim 1, wherein said frame element is arranged to surround said mass in said plane; and wherein said anchorage elastic elements are arranged outside said frame element and said mass with respect to said plane, each of said anchorage elastic elements coupled to said frame element to a respective anchorage, fixed with respect to said substrate.

13. The micromechanical structure according to claim 1, wherein said coupling elastic elements include torsional springs.

14. A MEMS device, comprising:
a micromechanical structure that includes:
a substrate;
a mass suspended above the substrate and having a main extension in a plane, the plane including a first direction and a second direction, the main extension of the mass having a first opening separated from a second opening by a portion of the main extension that forms a mobile electrode, the first and second openings have a same length in the first direction, the mobile electrode also has the same length, a first width of the first opening being larger than a second width of the second opening, the first and second width both extend along the second direction;

a first pair of fixed electrodes formed on the substrate, the first pair of fixed electrodes configured to extend into the first opening to interact with the mobile electrode, a portion of the substrate positioned below the second opening not including a fixed electrode;

coupling elastic elements;

anchorages attached to the substrate;

elastic anchorage elements;

a frame element, elastically coupled to said mass by the coupling elastic elements, and coupled to the anchorages by the anchorage elastic elements, said coupling elastic elements and said elastic anchorage elements are configured to enable a first inertial movement of said mass in response to a first external acceleration in the first direction, and to enable a second inertial movement of said mass in response to a second external acceleration in a third direction transverse to said plane; and an electronic reading circuit, electrically coupled to said micromechanical structure.

15. The MEMS device of claim 14, further comprising a second pair of fixed electrodes on the substrate and positioned beneath the mass, the first pair of fixed electrodes and the first mobile electrode are configured to generate a first capacitive variation in response to said first inertial movement and the second pair of fixed electrodes are configured to generate a second capacitive variation in response to said second inertial movement of said mass.

16. The MEMS device of claim 14 wherein said first inertial movement is a movement of translation in the first direction in said plane; and wherein said coupling elastic elements are configured to rigidly couple said mass to said frame element in said movement of translation, and said anchorage elastic elements are configured to be compliant to said movement of translation, to enable a relative movement of said frame element with respect to said substrate.

17. The MEMS device of claim 16, wherein said second inertial movement is a movement of rotation out of said plane about a rotation axis defined by said coupling elastic elements; and wherein said coupling elastic elements are configured to be compliant to said movement of rotation, to enable a relative movement of said mass with respect to said frame element.

18. An electronic device, comprising:

a micromechanical structure that includes:

a substrate;

a mass which has a main extension in a plane and is suspended above said substrate, the plane having a first axis and a second axis that is transverse to the first axis, the mass including:

a plurality of first openings, each first opening having a length that extends along the first axis, the plurality of first openings configured to form a first plurality of mobile electrodes;

a plurality of second openings, each second opening having a same length that extends along the second axis, the plurality of second openings configured to form a second plurality of mobile electrodes, a first one of the second openings having a first width that is greater than a second width of a second one of the second openings, the first one being separated from the second one by one of the second plurality of mobile electrodes;

a plurality of first pairs of fixed electrodes, each first pair configured to extend into one of the first openings, each electrode fixed to the substrate and configured to interact with one of the first plurality of mobile electrodes;

a plurality of second pairs of fixed electrodes, each second pair configured to extend into one of the second openings, each electrode fixed to the substrate and configured to interact with one of the second plurality of mobile electrodes, a portion of the substrate below the second one of the second openings configured to not include any fixed electrodes;

coupling elastic elements;

anchorages;

elastic anchorage elements, said coupling elastic elements and said anchorage elastic elements are configured to enable a first inertial movement of said mass in response to a first external acceleration about the first axis, and to enable a second inertial movement of said mass in response to a second external acceleration about a third axis transverse to said plane;

an electronic reading circuit, electrically coupled to said micromechanical structure; and a digital processing unit coupled to the micromechanical structure.

19. The electronic device of claim 18 wherein first plurality of mobile electrodes and the plurality of first pairs of fixed electrodes are configured to generate a first capacitive variation in response to said first inertial movement and a third pair of fixed electrodes fixed to the substrate and capacitively coupled to said mass and configured to generate a second capacitive variation in response to said second inertial movement of said mass.

20. The electronic device of claim 18 wherein said first inertial movement is a movement of translation in the first direction belonging to said plane; and wherein said coupling elastic elements are configured to rigidly couple said mass to said frame element in said movement of translation, and said anchorage elastic elements are configured to be compliant to said movement of translation, to enable a relative movement of said frame element with respect to said substrate.

21. The electronic device of claim 20, wherein said second inertial movement is a movement of rotation out of said plane about a rotation axis defined by said coupling elastic elements; and wherein said coupling elastic elements are configured to be compliant to said movement of rotation, to enable a relative movement of said mass with respect to said frame element.

22. A device, comprising:

a substrate;

elastic coupling elements;

a mass coupled to the substrate with the elastic coupling elements, the mass including:

a plurality of first openings, each first opening having a length in a first direction and a first width in a second direction transverse to the first direction;

a second opening having the same length in the first direction as the plurality of first openings and a second width in the second direction, the second width being smaller than the first width;

a mobile electrode formed between one of the first openings and the second opening; and a plurality of pairs of fixed electrodes formed on the substrate, each pair extending into one of the first openings, a portion of the substrate below the second opening having no fixed electrodes, the mass including a centerline, the plurality of first opening and the second opening being on one side of the centerline and a plurality of third openings being positioned on another side of the centerline, each third opening having the length in the first direction and the first width in the second direction.

23. The device of claim 22 wherein each electrode of each pair includes a rectangular anchor portion and an elongated suspended portion extending from the anchor portion.

24. The device of claim 23 wherein each pair includes a first electrode and a second electrode that is separated from the first electrode by a distance.

\* \* \* \* \*